Jan. 7, 1958 W. DE BACK 2,818,899
FRUIT END TRIMMER
Filed June 9, 1953 3 Sheets-Sheet 1
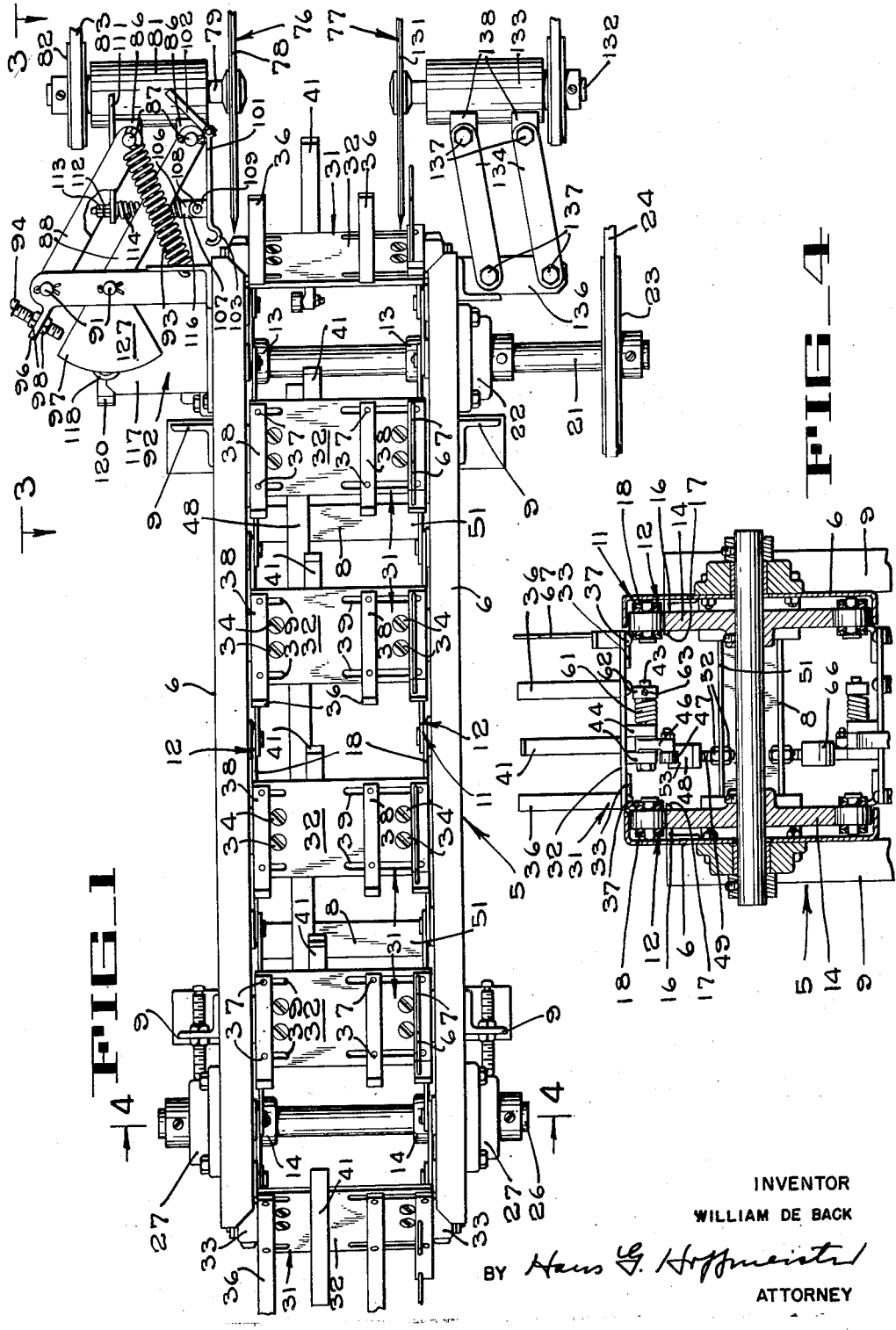
INVENTOR
WILLIAM DE BACK
BY Hans G. Hoffmeister
ATTORNEY Jan. 7, 1958 W. DE BACK 2,818,899
FRUIT END TRIMMER
Filed June 9, 1953 3 Sheets-Sheet 2
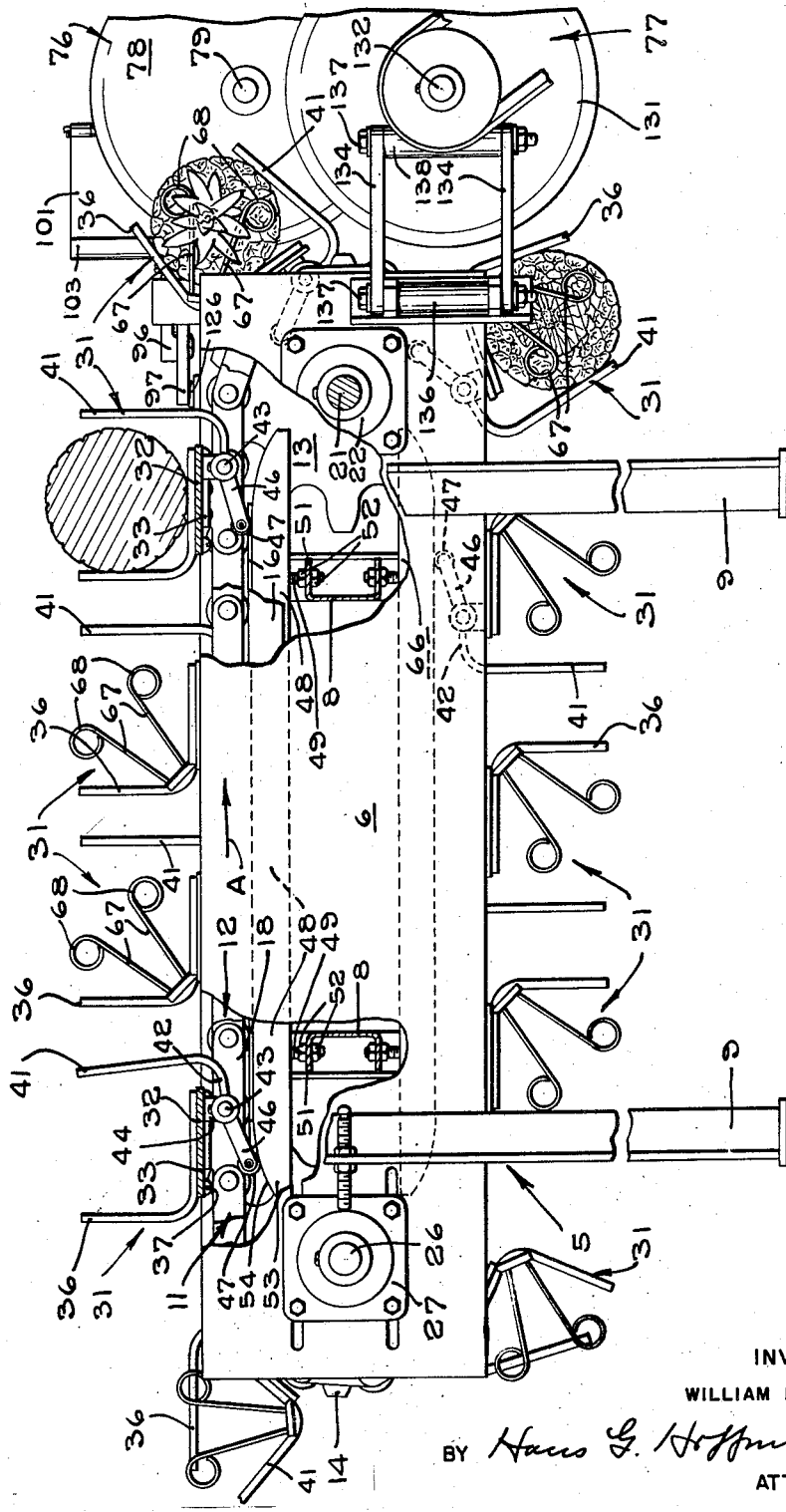
FIG_2
INVENTOR
WILLIAM DE BACK
BY Hans G. Hoffmeister.
ATTORNEY

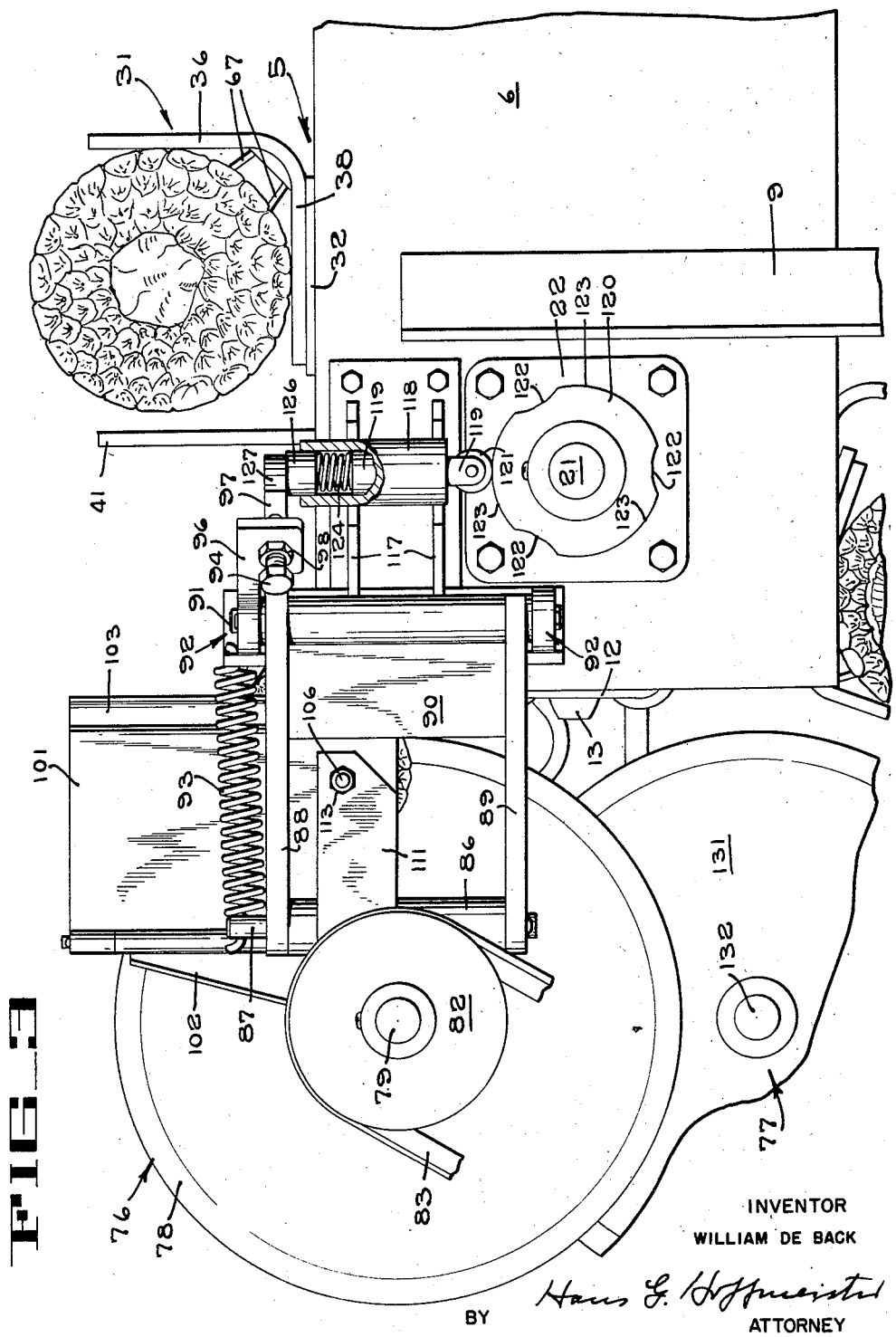

United States Patent Office 2,818,899
Patented Jan. 7, 1958

2,818,899

FRUIT END TRIMMER

William de Back, St. Nicolas-Waes, Belgium, assignor to Food Machinery and Chemical Corporation, San Jose, Calif., a corporation of Delaware Application June 9, 1953, Serial No. 360,479

7 Claims. (Cl. 146—81)

This invention relates to a machine for handling fruit, and more particularly to a machine for trimming pineapples or similar fruit as a step preliminary to further processing thereof.

Customary practice in the pineapple canning industry heretofore has been for the pickers to remove the crown from each pineapple at the time it is picked, so that space within the bins or trucks used for transporting the pineapples to the canneries is not taken up with the less valuable foliage. It is now apparent, however, that this practice is inherently disadvantageous because it interferes with the picking operation, frequently to the extent of diminishing by half the quantity of fruit a picker can pick and load in a given time. Additionally, if the heavily foliated crowns are left on the pineapples while they are being hauled to the cannery, they serve effectively to cushion the fruit against bruising and, by deferring the trimming of the crowns until after arrival at the cannery, the trimmed crown material can be added to other waste and, with it, processed into cattle feed or fertilizer, or otherwise converted to more valuable use than when left in the field for mulch or green fertilizer.

An object of the present invention, therefore, is to provide a machine for trimming pineapples, which is adapted to be cooperatively associated with other fruit handling apparatus in production line operation.

Another object of my invention is to provide a machine for trimming both the crown ends and the butt ends of fruit so as to prepare the fruit for subsequent operations, such as sizing, coring and peeling, which are facilitated by having both ends of each fruit trimmed in planes to which the main axis of the fruit is perpendicular.

Another object is to provide a fruit trimmer of the general character indicated, which trims each end to a predetermined depth without regard to the size of the fruit.

Another object is to provide a fruit trimming machine wherein the depth of trimming cut is automatically regulated by means of a gauge responsive to differences in the length of the fruit.

A further object is to provide a fruit trimming machine having a locking mechanism for holding the adjustable trimmer firmly in an adjusted position until completion of its operation of trimming the particular fruit the size of which has determined that adjustment.

Another object is to provide a fruit trimming machine provided with an improved conveyor structure for transporting the fruit to be trimmed successively to the trimming zone.

These and other objects and advantages of the present invention will become apparent from the following description and drawings, in which:

Fig. 1 is a plan view of a pineapple trimming machine of the present invention, certain portions being broken away.

Fig. 2 is a side elevation of the machine of Fig. 1, certain portions being broken away.

Fig. 3 is an enlarged elevation taken along lines 3—3 of Fig. 1.

Fig. 4 is a transverse section of Fig. 1 taken along line 4—4 thereof.

The pineapple handling machine of the present invention comprises a frame structure 5 including two channel members 6 rigidly maintained in spaced, parallel relation by a suitable number of transverse braces 8 and supported by a plurality of legs 9. The frame 5 carries a conveyor 11 which comprises two spaced parallel endless chains 12 extending longitudinally of the frame. Each chain is trained around a driving sprocket 13 (Figs. 1 and 2) adjacent one end of the machine and an idler sprocket 14 adjacent the other end. An angle member 16 (Figs. 2 and 4) is rigidly secured to the inner face of each of the channel members 6 in such position that the horizontal flange 17 of each angle member underlies the upper run 18 of the associated chain 12 in supporting relation thereto, to prevent excessive sagging thereof.

The two driving sprockets 13 (Figs. 1 and 2) are fixed to a common drive shaft 21 extending through axially aligned holes in the channels 6 and journalled in suitable bearings 22 affixed to the channel members. One end of the shaft 21 extends through one of the channels 6 to receive a driven pulley 23 engaged by a belt 24 adapted to receive power from a suitable source (not shown) and thereby rotate the shaft 21 to drive the conveyor 11 in the direction indicated by the arrow A in Fig. 2. The two idler sprockets 14 (Figs. 1, 2, and 4) are mounted upon a common shaft 26 journalled in bearings 27 carried by the channel members 6.

The conveyor 11, which during operation guides the fruit along a predetermined path, is provided with a plurality of pockets 31 each adapted to receive and retain a single pineapple. Each of these pockets 31 comprises a base plate 32 secured to aligned lugs 33, one of which is carried by each of the chains 12 of the conveyor 11. The base 32 is securely attached to these two associated lugs 33 by screws 34. Preferably two fingers 36 extend rigidly upwards from adjacent the trailing edge of the base 32 of each of the pockets 31, being secured to the base by screws 37 extending upwardly through slots 39 in the plate 32 and threadedly engaged with horizontal extensions 38 of the fingers 36. The slots 39 extend transversely with respect to the conveyor 11 with the result that by loosening appropriate screws 37, one or both of the fingers 36 can be adjusted to vary the spacing between the two fingers so as to achieve the optimum adjustment thereof as determined by the average size of the fruit to be handled.

A movable gripping finger 41 is associated with the fixed fingers 36 and in opposed relation thereto adjacent the leading edge of the base 32 of the associated pocket 31. However, instead of being located directly opposite either of the fixed fingers 36, this movable finger 41 is disposed substantially midway between the two fixed fingers 36 so that when a pineapple is gripped between the fingers 41 and 36, the three-point engagement of the pineapple thus attained is of such a nature that the fruit is securely held against dislodgment from the pocket 31. The lower end of the movable finger 41 is deflected so as to extend under the associated plate 32 where it is pivotally secured to the plate 32 by a pin 43 extending between lugs 44 rigid with and extending downwards from the plate 32 (Figs. 2 and 4). Extending in a trailing direction from the pin 43 and rigid with the deflected portion 42 of the movable finger 41 is an arm 46 at the outer end of which is provided a cam follower, preferably a roller 47. An elongated cam 48 extends longitudinally of the framework 5 and is mounted rigidly and adjustably upon longitudinally spaced braces 8 by studs 49 rigid with the cam 48 and extending through clearance holes (not shown) in horizontal flanges 51 of the braces 8, and having nuts 52 threaded upon each stud 49, one above and the other below the flange 51. The cam 48 is so located, considered transversely of the framework 5, that it is in position to be engaged successively by the several rollers 47 during the operation of the conveyor 11. As each roller 47 encounters the end 53 of the cam 48 at the left-hand end of the machine as viewed in Figs. 1 and 2, it rides upwards upon an inclined camming surface 54 of the cam so as to lift the associated arm 46 and thereby turn it and the movable finger 41 to which it is rigidly secured in clockwise rotary movement as viewed in Fig. 2, thereby more widely separating the upper end of the finger 41 from the plane of the fixed fingers 36. The parts are so proportioned and arranged that this separating motion of the finger 41 continues at least until it is parallel to the plane of the fixed fingers 36 so that a pineapple can readily be placed in any one of the pockets 31 the rollers 47 of which are riding upon the elongated cam 48. Thus it will be understood that the elongated characteristic of the cam 48 is for the purpose of providing a loading station of sufficient extent to facilitate loading of each of the several pockets 31 with a pineapple.

Resilient means are provided for urging the movable finger 41 to move in the opposite direction, i. e., toward the plane of the fixed fingers 36 to grip the pineapple firmly while it is being trimmed. For this purpose a coil spring 61 (Fig. 4) is arranged upon an end of the pin 43 extending beyond the associated supporting lug. This spring 61 is spirally tensioned between the adjacent supporting lug 44 and a collar 62 rigidly and adjustably secured to the pin 43 by a set screw 63. The spring 61 urges the pin 43, with which both the associated camming arm 46 and finger 41 are rigid, to rotate in a counterclockwise direction as viewed in Fig. 2. Hence the pressure which the movable finger 41 exerts against a pineapple seated within the associated pocket 31 is determined solely by the spring 61, thus making it possible to accommodate pineapples of different diameters. This resilient type of gripping finger actuator also provides adequate protection against bruising of the larger pineapples which probably would result were the finger 41 moved to its gripping position by a positive, mechanical operation, and it does so without impairing the security with which a smaller fruit is retained within the pocket. When in its gripped position, the movable finger 41 is disposed in an inclined position, sloping from the plane of the base 32 and toward the plane of the fixed fingers 36, thus defining a pocket which is narrower at its outer or top portion than adjacent the base 32 and thereby further increasing the security with which a pineapple is retained within the pocket.

Another elongated cam 66 is mounted directly below the cam 48 but in opposed relation thereto so that the rollers 47 of the several camming arms 46 can successively engage the cam 66 after their respectively associated pockets 31 have passed the trimming mechanism. This causes the movable fingers 41 to swing from their fruit gripping position and to their fruit releasing position as the pockets 31 assume an inverted position underneath the framework 5. Thus the pineapples are released from the pockets and permitted to fall by gravity from under the machine and into any suitable receptor therefore (not shown).

Means are also provided in each of the pockets 31 for positioning a pineapple therein with a degree of precision which assures trimming of the crown end thereof to remove the necessary amount of crown with a minimum of waste of the edible portion. For this purpose each pocket 31 is provided with two upwardly and forwardly inclined resilient arms 67 mounted adjacent the end of the pocket 31 in which the crown ends of the pineapples are placed. These two arms 67 diverge from each other so that their outer ends are spaced more widely than their inner ends, thus facilitating manually thrusting the stem portion of the foliage at the crown end of the pineapple between two arms 67. The pineapple should be positioned in the pocket with the shoulders of the body of the fruit nearest the neck of the foliage, bearing against the resilient arms 67 so that the arms 67 serve as locators determining the position of the pineapple within the pocket 31, considered transversely of the machine. The free end of each resilient arm 67 is curled outwards as indicated at 68 to provide a more widely flaring entrance throat to the space between the two arms and thereby facilitate engagement of the neck of the pineapple's foliage therein.

Two separate and independently operating trimming mechanisms 76 and 77 (Figs. 1, 2 and 3) are mounted upon the framework 5 preferably adjacent the ends of the channel members 6 with which the drive shaft 21 is associated. These two trimming mechanisms 76 and 77 are so arranged that they are not in direct opposition to each other. Instead, the mechanism 76 for trimming the butt ends of the pineapples is arranged far enough in advance of the trimmer 77 for the crown ends to assure trimming of the butt ends before trimming of the crown ends. This is because the resilient arms 67 engage the pineapples at their crown ends and thus assist in the retention of the pineapples within their pockets and it is therefore desirable not to sever the crowns from the fruit until trimming of the butt ends is completed. However, both trimming mechanisms 76 and 77 are so disposed that both trimming operations of a single pineapple occur after the roller 47 associated with the pocket 31 within which that pineapple is seated, has passed out of engagement with the cam 48 and before the roller encounters the cam 66.

As hereinabove explained, the trimming mechanism first encountered by a pineapple is the butt trimmer 76 (Fig. 1). This mechanism comprises a circular blade 78 carried by a shaft 79 which is journalled in a suitable bearing housing 81. Secured to the shaft 79 is a pulley 82 engaged by a driving belt 83 so that the knife 78 can be rotated at a suitable speed and from a suitable source of power (not shown). Lugs 86 preferably integral with the bearing housing 81 are spaced apart thereon. The lugs 86 carry pivot pins 87 the axes of which are vertical and are disposed in a plane to which the shaft 79 is parallel, i. e., in a plane extending transversely with respect to the frame 5. An upper and a lower link 88 and 89, respectively, are joined together into an integral unit by a web 90, and one of these units is freely pivoted upon each of the pins 87. All four of the links 88 and 89 are of corresponding length and are disposed in parallel relation to each other. The ends of the links 88 and 89 opposite those which are engaged by the pins 87 are pivotally engaged by pins 91 which are carried by a bracket 92 extending laterally from the channel member 6 on the opposite side of the frame 5 from that with which the pulley 23 is associated. Hence the butt trimming mechanism 76 is mounted for adjustment in translatory motion transversely with respect to the framework 5. A coil spring 93 under tension between the outer pin 87 and the bracket 92 closely adjacent the framework 5 continually urges the butt trimming mechanism 76 to swing inward to its inner extreme of transverse adjustment as determined by an abutment screw 94 threaded through an extension 96 of the bracket 92 in position to engage an extension 97 of one of the links 88. Lock nuts 98 on the screw 94 retain it in its selected position of adjustment which thereby determines the extreme position of inward movement of the blade 78 of the butt trimming mechanism 76.

Means are provided for automatically adjusting the butt trimming mechanism 76 laterally outward from its extreme innermost position in accordance with the length, measured transversely of the framework 5, of the next successive pineapple to be trimmed by the mechanism 76. A gauging plate 101 is pivotally mounted on a bracket 102 (Fig. 1) rigid with the bearing housing 81. From the bracket 102 the gauging plate 101 extends substantially parallel to the plane of the blade 78 and for such a distance that its rounded outer end 103 is spaced farther from the shaft 79 than the cutting edge of the blade 78. This assures that the butt end of a pineapple being conveyed toward the blade 78 in one of the pockets 31 will engage the rounded end 103 of the gauging plate 101 before the pineapple encounters the blade 78. Consequently, adjustment of the butt trimming mechanism 76 will take place before the trimming cut begins.

The gauging plate 101 can be adjusted so as to regulate the depth of cut of the blade 78 by means of an adjusting bolt 106 having an eye 107 at one end which is pivotally connected by a pin 108 to a lug 109 on the outer face of the gauging plate 101. The other end of the bolt 106 extends through a clearance hole in a bracket 111 rigid with the bearing housing 81 and has an adjusting nut 112 and a lock nut 113 threaded thereon beyond the bracket 111. A coil spring 114 is under compression between the bracket 111 and a shoulder 116 on the bolt 106; and this spring normally retains the gauging plate 101 in its position of closest approach to the plane of the blade 78. When some unusual circumstance arises, causing excessive lateral pressure to be exerted against the plate 101 after a trimming cut has started, the spring 114 will yield and thus avoid damage to either the fruit or the machine. For example, after a pineapple has initially encountered the gauging plate 101 and caused the butt trimming mechanism 76 to shift laterally to the position determined by the length of the pineapple, and the pineapple then advanced far enough for the blade 78 to cut partially therethrough the gauging plate 101 might encounter an unusual protuberance upon the portion of the pineapple last to pass the plate's rounded end. However, since the blade 78 already by that time would have passed part-way through the pineapple, the trimming mechanism 76 should not be permitted to shift laterally. Instead, the spring 114 will yield, permitting the gauging plate 101 to override the protrusion and thereby avoiding damaging the machine or tearing the fruit either by the plate 101 digging into the butt end or by the blade 78 being forced laterally through the fruit.

Additional precaution is taken against lateral shifting of the butt trimming mechanism 76 after it has once been moved to appropriate position of adjustment as determined by the length of the pineapple to be trimmed. Extensions 117 (Fig. 3) of the bracket 92 carry a vertical sleeve 118 within which a push rod 119 is reciprocably mounted. A cam 120 is mounted upon an extension of the shaft 21 on the opposite side of the frame 5 from the pulley 23. The lower end of the rod 119 carries a cam follower, preferably a roller 121, engaging the cam 120 so that as the depressions 122 and higher portions 123 of the cam 120 alternately engage the roller 121 the rod 119 will be lowered and raised, respectively. A coil spring 124 is under compression between the upper end of the rod 119 and a block 126 of suitable friction material which is slidably mounted in the upper end of the sleeve 118. Hence the spring 124 serves the double function of maintaining the cam follower 121 in engagement with the cam 120 and of holding the brake block 126 at such elevation that when the cam follower 121 rides upon a high portion 123 of the cam 120, it frictionally engages, and with suitable resilient pressure, the under surface of a sector-shaped extension 127 of one of the parallel links 88. In this way positive mechanical locking of the butt trimming mechanism 76 prevails at all times that the cam follower 121 rides upon a high portion 123 of the cam 120; and the parts are so proportioned and arranged that this engagement of the clamping mechanism occurs just prior to engagement of the blade 78 with a pineapple and lasts until the pineapple has had its butt end completely trimmed and has passed beyond the cutting edge of the blade 78. The spring 124 is of such length that when the cam follower 121 seats within one of the notches 122, the brake block 126 will drop out of engagement with the links' extension 127. Consequently the notches 122 should be of such width, measured circumferentially of the cam 120, that they afford ample time for adjustment of the trimming mechanism 76 after a pineapple has encountered the gauging plate 101, before the follower 121 rides up out of the trailing end of the notch onto a higher portion 123 of the cam. Moreover, the cam 120 is located carefully upon the shaft 20 to assure that the roller 121 is seated within one of the notches 122 whenever a pineapple carried in one of the pockets 31 encounters the gauging plate 101.

As will be readily understood by observation of Fig. 2, the butt trimming mechanism 76 is in such position that a pineapple carried in one of the pockets 31 encounters the gauging plate 101 as that pocket is being carried around the sprockets 13 and, consequently, after the associated gripping finger actuating arm 46 has passed out of engagement with the upper cam 48. This assures that the pineapples are gripped within the pocket 31 with sufficient firmness to prevent lateral shifting of the pineapple while the plate 101 presses thereagainst to shift the trimming mechanism 76.

After completion of the operation of trimming the butt end of a pineapple by the blade 78, the fruit is carried on around the sprockets 13 and into engagement with a similar parallel blade 131 of the crown trimming mechanism 77. This blade 131 is carried by a shaft 132 which is journalled in a bearing housing 133 carried by two pairs of spaced parallel links 134. The links 134 are carried by bolts 137 which can be tightened to press the links against lugs 138 on the bearing housing 133 which are engaged by the one ends of the links 134, and against their supporting bracket 136 which is engaged by the other ends of the links 134. This serves effectually to lock the crown trimming mechanism 77 in selected position of adjustment laterally of the trimming machine, and it also permits, by loosening the bolts 137, lateral adjustment of the mechanism 77 in translatory motion maintaining the blade 131 in accurate parallel alignment with the path being traversed by pineapples on the conveyor 11.

Preferably the crown trimming mechanism 77 is so adjusted that the blade 131 is inside and only slightly spaced from the path of the resilient arms 67. Consequently, the body portion of the fruit is severed from the foliage which is gripped between the resilient arms 67 with minimum waste. After a thus trimmed pineapple has been carried around the sprockets 13 far enough for the associated gripping finger actuating lever 46 to encounter the releasing cam 66 and thereby effect movement of the associated gripping finger 41 to its releasing position, the pineapple will be free and will drop by gravity out of the now inverted pocket 31.

Thus it is apparent that a single operator is all that is required for the operation of the pineapple crown and butt trimming machine of my invention. The only services of an attendant which it needs is that of a loader, to place one pineapple in each of the pockets 31, with the neck of the foliage thereof pressed into the tapering space between the associated resilient arms 67 and with shoulders of the body of the fruit at the base of the neck closely adjacent or in actual engagement with the arms 67. The unloading of the trimmed fruit from the pockets 31 of the conveyor is effected automatically; and the trimming machine may be so located and operatively associated with the next machine (not shown) of a production line, such as a coring and paring machine, that the trimmed pineapples drop or slide into the receptor of that next machine, or onto a conveyor leading thereto. Hence, in many instances, an attendant whose duty it was to load pineapples into such a coring and paring machine, can be dispensed with, with the result that no additional personnel is required for the operation of the production line by the addition thereto of the trimming machine of the present invention.

While I have explained my invention with the aid of a particular embodiment thereof, it will be understood that I do not wish to be limited to the specific constructional details illustrated and described, but that departure can be made therefrom without evasion of the spirit and scope of the claims.

Having thus described my invention what I claim as new and desire to protect my Letters Patent is:

1. In a fruit trimmer, a frame, a cutter rotatable relative to said frame, means mounted on said frame for guiding fruit in a path adjacent said cutter, means mounting said cutter on said frame and in cooperative relation to said guiding means and for adjustment transversely of said path to determine the depth to which said cutter will trim, gauging means connected to said cutter mounting means and responsive to the size of fruit measured transversely of said path for adjusting said cutter, a resilient link connected between said gauging means and said cutter mounting means and arranged to yieldingly resist movement of said gauging means without adjustment of said cutter when said cutter is held in any position of adjustment, and means operatively connected between said frame and said cutter mounting means for locking said cutter in an adjusted position while said cutter is in engagement with a fruit.

2. In apparatus for trimming fruit of various sizes as they are transported therepast in a predetermined path on a conveyor with a certain end of each fruit in predetermined lateral position with respect to the conveyor, a frame, means for mounting said frame in fixed relation to the conveyor, trimming means comprising a support mounted on said frame and disposed adjacent said conveyor and a cutter mounted on said support for operation in a plane to which the conveyor is parallel, a pair of parallel links pivoted to said frame for movement about spaced, parallel axes and pivoted to said support for movement about parallel axes spaced from each other and from said first mentioned axes whereby said links restrict adjustment of said trimming means to translatory movement, means mounted on said frame and responsive to difference between the respective lengths of adjacent fruit on the conveyor for moving said trimming means transversely of the conveyor, means operable to retain said trimming means in selected position of adjustment comprising a brake block mounted on said frame for movement toward and away from one of said links in a direction substantially parallel to the axes of said links, and means operably connected between said brake block and said conveyor and arranged to be actuated in synchronism with movement of each fruit on said conveyor for advancing said brake block into engagement with said one of said links and maintaining such engagement for periods of predetermined duration.

3. In apparatus for trimming fruit, the combination of an endless conveyor arranged to transport a piece of fruit along a predetermined path, a power actuated drive shaft operatively connected to said conveyor to move said conveyor, a movable mounting mechanism supported by said conveyor, a fruit trimmer carried by said mounting mechanism adjacent said conveyor and extending into the path of movement of a piece of fruit carried on said conveyor, a cam keyed on said drive shaft, and a brake member actuated by said cam and arranged to engage said movable mounting mechanism to lock said trimmer in fixed position during a predetermined portion of travel of said conveyor.

4. In apparatus for trimming fruit, a conveyor for fruit to be trimmed, actuating means for said conveyor, trimming means movably mounted for adjustment transversely with respect to said conveyor, gauging means associated with said conveyor in position to be actuated by fruit being transported by said conveyor, means resiliently interconnecting said trimming means and said gauging means for adjusting said trimming means in response to actuation of said gauging means, and locking means actuated by said conveyor actuating means and associated with said trimming means to lock said trimming means in a fixed lateral position when said trimming means is in engagement with said fruit, said gauging means being adapted to be resiliently deflected when said trimming means is held in a locked position whereby to allow obstructions on the end of the fruit being trimmed to pass said gauging means without altering the fixed lateral position of said trimming means.

5. In an apparatus for trimming fruit, a frame, a conveyor mounted for movement on said frame, locators on said conveyor for positioning fruit thereon with one end substantially at a constant lateral spacing with respect to said conveyor, a trimming cutter mounted on said frame in fixed lateral relation to said conveyor in position to trim said one end as the fruit is carried therepast on the conveyor, an adjustable trimming cutter mounted on said frame to pivot transversely of said conveyor and disposed laterally from said fixed cutter and longitudinally of the path of movement of the fruit from said fixed cutter to trim the second end of said fruit as said fruit is transported therepast, means operatively connected to said adjustable cutter and disposed to contact the second end of the fruit to transversely adjust the adjustable cutter in accordance with the length of the fruit, and locking means operatively connected between said frame and said adjustable cutter for maintaining said adjustable cutter in adjusted position during the trimming operation of said adjustable cutter, said adjustable cutter being positioned to complete its trimming operation prior to the beginning of the trimming operation of said fixed trimming cutter.

6. In fruit trimming apparatus, a frame, means mounted on said frame for guiding fruit for movement in a predetermined path, trimming means mounted on said frame adjacent said guiding means in position to trim fruit guided thereby, said trimming means being adjustable on said frame transversely of said guiding means to determine the depth to which said trimming means will trim, gauging means connected to said trimming means and responsive to the size of fruit measured transversely of said guiding means for adjusting said trimming means, and resilient means connected between said gauging means and said trimming means and arranged to yieldably resist movement of said gauging means without adjustment of said trimming means when said trimming means is held in any transverse position of adjustment.

7. In apparatus for trimming fruit of various sizes as they are transported therepast in a predetermined path on a conveyor with a certain end of each fruit in predetermined lateral position with respect to the conveyor, a frame, means for mounting said frame in fixed relation to the conveyor, trimming means comprising a support mounted on said frame and disposed adjacent said conveyor and a cutter mounted on said support for operation in a plane to which the conveyor is parallel, means mounting said support on said frame for translatory movement, means mounted on said support and responsive to the difference between the respective lengths of adjacent fruit on the conveyor for moving said trimming means transversely of the conveyor, means operable to retain said trimming means in selected position of adjustment comprising a brake block mounted on said frame for movement towards and away from said support mounting means, and means operably connected between said brake block and said conveyor and arranged to be actuated in synchronism with movement of each fruit on said conveyor for advancing said brake block into engagement with said support mounting means and maintaining such engagement for periods of predetermined duration.

References Cited in the file of this patent

UNITED STATES PATENTS

| | | |
|---|---|---|
| 891,054 | Frankman | June 16, 1908 |
| 1,282,462 | Ricks | Oct. 22, 1918 |
| 1,290,049 | Bass | Jan. 7, 1919 |
| 1,508,708 | McBride | Sept. 16, 1924 |
| 1,544,887 | Burtless | July 7, 1925 |
| 1,640,745 | Ayars | Aug. 30, 1927 |
| 2,486,367 | Abrey et al. | Oct. 25, 1949 |
| 2,621,692 | Urschel et al. | Dec. 16, 1952 |
| 2,626,701 | Avetta et al. | Jan. 27, 1953 |
| 2,683,893 | Baader | July 20, 1954 |

FOREIGN PATENTS

| | | |
|---|---|---|
| 650,653 | Great Britain | Feb. 28, 1951 |